United States Patent Office 3,112,272
Patented Nov. 26, 1963

3,112,272
STABILIZED ORGANIC MATERIALS CONTAINING PHENOLIC AND PHOSPHATE COMPOUNDS
Leonard Sidney Echols, Ferguson, Mo., assignor to Shell Oil Company, New York, N.Y., a corporation of Delaware
No Drawing. Filed Dec. 31, 1959, Ser. No. 863,066
8 Claims. (Cl. 252—46.6)

This invention relates to improved organic compositions, more particularly to hydrocarbon oil compositions having enhanced oxidation stability.

Many organic materials such as fuels, lubricating oils, greases, waxes, asphalts and synthetic resins have been developed for various purposes. It is customary to incorporate in a variety such products, one or more of various phenolic or aromatic amine oxidation inhibitors. Compounded compositions of this type, although effective under moderate temperature and pressure conditions, are relatively ineffective at high temperatures and pressures, resulting in the breakdown and formation of sludge and solid deposits which are undesirable because they cause wear and damage. Recently, attempts have been made to overcome this defect and to improve not only the oxidation stability of organic materials but other properties as well, by combining well known anti-oxidants (phenols and amines) with certain non-ash forming polymeric compounds. However, any enhanced benefit in the use of such combinations for oxidation stability is of short duration.

It has now been discovered that the oxidative stability of organic materials, such as for example petroleum products, containing certain polyhydric phenolic compounds (A) is greatly enhanced and the overall properties of such compounded materials substantially improved by the addition thereto of a small amount of certain aryl acid phosphates (B). The polyhydric phenolic compounds (A) may be represented by the formula:

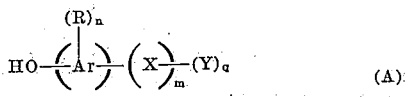
(A)

wherein Ar is an aromatic group having attached to different ring carbons a hydroxyl group (—OH) and at least one $C_{1-8}$ alkyl radical (R), X is selected from the group consisting of oxygen, sulfur or CHR', Y is selected from the group consisting of hydrogen, —OH or

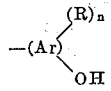

where R' is hydrogen or a $C_{1-4}$ alkyl radical, $n$ is an integer of at least 1, preferably 2, and $m$ and $q$ are each an integer from zero to 1.

The aryl acid phosphate (B) generically including the thiophosphates, has the general formula

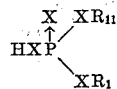

wherein the different X's are independently selected from oxygen and sulfur, preferably all being oxygen, $R_1$ is hydrogen or a hydrocarbyl radical, preferably an aryl radical and $R_{11}$ is an aryl radical, preferably a $C_{1-5}$ alkyl substituted phenyl radical.

The oil-soluble phenolic compounds (A) include a variety of polyhydric phenolic compounds of which the preferred ones are represented by the formula

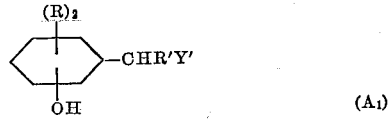
(A₁)

wherein R and R' are as defined in (A) and Y is a hydroxyl group (—OH) or is a

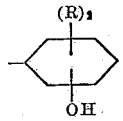

radical. Still more preferred phenolic compounds have the formula:

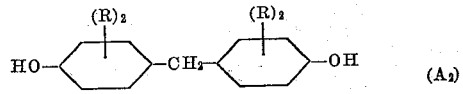
(A₂)

or

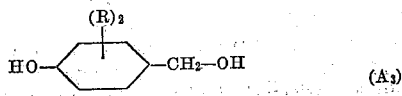
(A₃)

where R is tert-alkyl radical of which preferred are the phenols (A₂ and A₃) wherein the R's are tertiary alkyl radicals both of which are on ring carbons ortho to the phenolic hydroxyl group and represented by

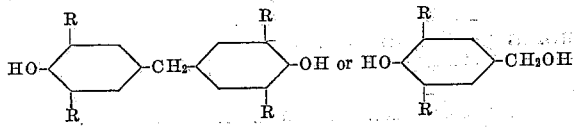

where the R's are tertiary alkyl radicals.

The oil-soluble A₂-type phenols include 3,3',5,5'-tetraisopropyl-4,4'-dihydroxydiphenyl;
3,3'-dimethyl-5,5'-ditert-amyl-4,4'-dihydroxydiphenyl;
1,1-bis(3,5-ditert-butyl-4-hydroxyphenyl)methane;
1,1-bis(3,5-diisopropyl-4-hydroxyphenyl)methane;
1,1-bis(3,5-di-sec-butyl-4-hydroxyphenyl)methane;
1,1-bis(3-isopropyl-5-tert-butyl-4-hydroxyphenyl)methane;
1,1-bis(3,5-di(2-octyl)-4-hydroxy-phenyl)methane;
1,1-bis(3-sec-butyl-5(2-hexyl)4-hydroxyphenyl)methane;
1,1-bis(3-isopropyl-5-(1,1,3,3-tetramethylbutyl)4-hydroxyphenyl)methane;
1,1-bis(3-tert-butyl-5-methyl-2-hydroxyphenyl)methane;
1,1-bis(3-tert-butyl-5-methyl-2-hydroxyphenyl)ethane;
1,1-bis(3-tert-butyl-5-methyl-2-hydroxyphenyl)propane;
1,1-bis(3-tert-butyl-5-methyl-2-hydroxyphenyl)isobutane;
1,1-bis(3-methyl-5-tert-butyl-6-hydroxyphenyl)methane;
1,1-bis(3,5-ditert-butyl-4-methoxyphenyl);
3,5-di-tert-butyl-4-methylphenyl)methane;
1,1-bis(3,5-di-tert-butyl-4-hydroxyphenyl)ether;
4,4'-thio-bis(6-tert-butyl-o-cresol).

The A₃-type phenolic compounds include 2,6-di-tert-butyl, 2,6-dimethyl, 2-tert-butyl, 6-methyl-, 2,2-di-tert-butyl, 2,6- dicyclohexyl-, 2-methyl-6-propyl-, 2-methyl-6-hexyl-4-methylol phenols.

The acid aryl phosphates may be represented by the formula

(B)

where X is oxygen or sulfur, preferably oxygen, Ar is an aromatic group and $R_1$ is hydrogen or the same as Ar, the Ar group may be mono or polynuclear and have $C_{1-13}$ alkyl radicals attached thereto.

The acid aryl phosphates (B) which are preferred are represented by the formulas

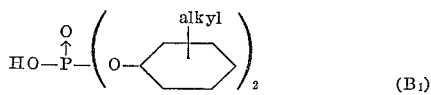

($B_1$)

or

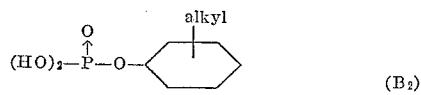

($B_2$)

or mixtures of $B_1$ and $B_2$.

The acid aryl phosphates or acid aryl thiophosphates represented by the above-formulas include the mono acid aryl phosphates and diacid aryl phosphates and their thio-derivatives and mixtures thereof. Thus, the compounds of this class may be specifically illustrated by phenyl, naphthyl, $C_{1-10}$ alkylphenyl, e.g., methyl, ethyl, butyl, dimethyl, diisopropylphenyl monoacid and diacid phosphates and thiophosphates of which preferred are monocresyl and dicresyl acid phosphates and 50:50 mixtures thereof.

Under certain conditions the addition of a third additive (C), a full ester of the above phosphates and thiophosphates is desirable, particularly when the organic material such as a mineral oil lubricant is subjected to extreme temperatures, pressure, and corrosive conditions. Such phosphates (C) include triphenylphosphate, tricresylphosphate, tricresylthiophosphate, tributylphenylphosphate and the like.

The two or three additive combinations (A+B) or (A+B+C) of this invention effectively stabilize various organic materials such as oleaginous materials, polymers, fuels, waxes, resins and particularly liquid hydrocarbons such as gasoline, jet fuels, transformer oils, turbine oils, mineral lubricating oils, and industrial oils such as cutting fluids, quenching fluids, etc. The anti-oxidant and stabilizing additive combination is particularly useful in highly refined mineral oils of the lubricating oil viscosity range (SAE 10W–SAE 90) from which natural occurring oxidation inhibitors have been removed by refining. Additionally, synthetic hydrocarbon oils and resins such as olefin polymers, e.g., ethylene/propylene, isobutylene/octadecene, isobutylene/styrene copolymers, etc., as well as synthetic oils of the ester type, e.g., di-2-ethylhexyl-sebacate, etc., are improved by the additive combination of this invention.

In accordance with the present invention, the incorporation of the additive mixtures (A+B) or (A+B+C) in amounts of from about 0.001% to about 5%, preferably from about 0.01% to about 2.5%, each, effectively inhibits oxidation and reduces corrosivity of various organic materials, particularly petroleum products.

The pronounced and unexpected results obtained by use of the additive combination of the invention are demonstrated by results of evaluations of the additives in a refined mineral white oil, using the (I) Dornte Oxidation Stability Test described in National Petroleum News, September 17, 1941, pages R-294-296, using iron catalyst at 150° F. and the (II) Copper Strip Corrosion Test at 300° F., wherein the rating was 0 to 10 with 10 being poor and zero being excellent. The properties of the white oil are gr., ° API, 29-31; color, 30 min.; pour point, ° F., max. 15; flash, COC, ° F., min. 420; vis., SUS, at 100° F., 345-355; unsap. res., min. 98. The results are shown in Table I.

Table I

| Additive | (I) Oxidation Test Induction Period (hrs.) | (II) Cu Strip Rating |
|---|---|---|
| (1) None | 0.3 | 10 |
| (2) 0.04% dicresylphosphate | 4 | 8 |
| (3) 0.25% 1,1-bis(3,5-di-tert-butyl-4-hydroxyphenyl)methane | 43 | 8 |
| (4) (3)+0.4% tricresylphosphate | 43 | 8 |
| (5) (2)+(4) | 76.5 | 0 |
| (6) (2)+(3) | 91.5 | 3 |
| (7) 0.02% dicresylphosphate+0.02% monocresyl phosphate+(3) | 91.5 | 3 |

From the results presented in Table I it can be seen that compositions of the present invention (5, 6 and 7) are from 2 to 18 times as effective in inhibiting oxidation than are compositions (2, 3, and 4) which contain only one of the additives. Compositions 5, 6 and 7 of the present invention are superior in corrosion inhibition to other compositions such as 1–4.

Other compositions of this invention which would give comparable results to compositions 5, 6 and 7 (Table I) of this invention include:

(8) SAE 30 mineral oil+0.2% 1,1-bis(3,5-di-tert-butyl-4-hydroxyphenyl) methane+0.02% monocresylphosphate+0.02% dicresylphosphate.

(9) White oil+0.2% 2,6-di-tert-butyl-6-methylolphenol+0.04% dicresylphosphate.

(10) SAE 30 mineral oil+0.3% 2,6-di-tert-butyl-6-methylolphenol+0.08% dicresylphosphate+0.1% tricresylphosphate.

(11) SAE 30 mineral oil+0.6% 1,1-bis(3,5-di-tert-butyl-4-hydroxyphenyl) methane+0.08% dicresylphosphate+0.1% tricresylthiophosphate.

Compositions of this invention are useful for providing stability and other desired properties to petroleum products such as mineral lubricating oils which also contain small amounts (0.1% to 3%) of other agents such as metal detergents such as metal organic sulfonates, e.g., neutral or basic Ca, Ba, or Zn petroleum sulfonates; anti-wear agents such as metal thiocarbamates, e.g., Zn, Cr, or Ca dibutyl or diamyl dithiocarbamate; viscosity-index improvers, pour point depressants and non-ash forming detergents such as the oil-soluble polymethacrylates available under the name "Acryloids" and, specifically, "Acryloid" 150, 618, 710, 768, described in U.S. Patent 2,710,842 or "Acryloids" of the 900 series, e.g., 917 and 966 described in British Patent 808,664 and French Patent 1,161,098 which are vinyl pyrrolidone alkyl methacrylate copolymers or other nitrogen-containing copolymers such as dodecyl methacrylate/diethylaminoethyl methacrylate copolymer or vinyl pyridine/alkyl methacrylate copolymers described in British Patent 807,735 and U.S. Patents 2,737,496 and 2,889,282; extreme pressure agents such as aliphatic amine salts of mono- or trichloromethanephosphonic acid, or the ester or amide of such acids; alkyl thiomethylphosphonic acid or esters thereof such as mono or dibutyl decyl mercaptomethylphosphonate organic sulfides, e.g., dibenzyl disulfide and mixtures thereof.

I claim as my invention:

1. A hydrocarbon oil composition comprising a major amount or hydrocarbon oil and from about 0.001 to about 5% each of (A) a polyhydric aromatic compound having the formula

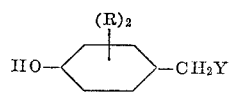

where R is a $C_{1-8}$ alkyl radical and Y is a polar radical selected from the group consisting of —OH and

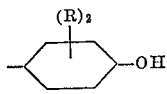

and (B) an aryl acid phosphate having the general formula

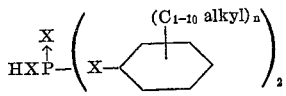

where the X's are selected from the group consisting of oxygen and sulfur and $n$ is an integer from 0 to 2.

2. The hydrocarbon oil composition of claim 1 wherein the hydrocarbon oil is a mineral oil, the polyhydric aromatic compound is a p,p'-methane bis(dialkylphenol) and the aryl phosphate is di($C_{1-10}$ alkylphenyl) acid phosphate.

3. A mineral lubricating oil composition comprising a major amount of mineral lubricating oil and from about 0.01% to about 2.5% each of 1,1-bis(3,5-ditert-butyl-4-hydroxyphenyl)methane and dicresyl phosphate.

4. A mineral lubricating oil composition comprising a major amount of mineral lubricating oil and from about 0.01% to about 2.5% each of 2,6-di-tert-butyl-4-methylolphenol and dicresyl phosphate.

5. A mineral lubricating oil composition comprising a major amount of mineral lubricating oil and from about 0.01% to about 2.5% each of 1,1-bis(3,5-ditert-butyl-4-hydroxyphenyl)methane, dicresyl phosphate, and tricresyl phosphate.

6. A mineral lubricating oil composition comprising a major amount of mineral lubricating oil and from about 0.01% to about 2.5% each of 2,6-ditert-butyl-4-methylolphenol, dicresyl phosphate, and tricresyl phosphate.

7. A mineral lubricating oil composition comprising a major amount of mineral lubricating oil and from about 0.01% to about 2.5% each of 1,1-bis(3,5-ditert-butyl-4-hydroxyphenyl)methane, monocresyl phosphate and dicresyl phosphate.

8. A hydrocarbon oil composition of claim 2 wherein the hydrocarbon oil contains, in addition, a tri($C_{1-10}$ alkylphenyl) phosphate.

References Cited in the file of this patent
UNITED STATES PATENTS

| | | |
|---|---|---|
| 2,080,299 | Benning et al. | May 11, 1937 |
| 2,167,867 | Benning | Aug. 1, 1939 |
| 2,721,846 | Lyons et al. | Oct. 25, 1955 |
| 2,807,653 | Filbey et al. | Sept. 24, 1957 |
| 2,830,025 | Knowles et al. | Apr. 8, 1958 |
| 2,927,932 | Preston | Mar. 8, 1960 |
| 2,944,086 | Coffield et al. | July 5, 1960 |